United States Patent

Itoh

[11] Patent Number: 5,818,964
[45] Date of Patent: Oct. 6, 1998

[54] METHOD AND APPARATUS FOR SELECTING AN ADAPTIVE FILTER FOR IMAGE DATA

[75] Inventor: Yuji Itoh, Tsukuba, Japan

[73] Assignee: Texas Instruments Incorporated, Dallas, Tex.

[21] Appl. No.: 579,660

[22] Filed: Dec. 27, 1995

[30] Foreign Application Priority Data

Dec. 27, 1994 [JP] Japan .................................. 6-324799

[51] Int. Cl.$^6$ .............................. G06K 9/40; G06T 5/00; H04N 1/409
[52] U.S. Cl. .......................... 382/205; 382/261; 382/275; 358/463
[58] Field of Search ................................... 382/261, 260, 382/262, 263, 264, 275, 237, 270, 272, 205; 358/463, 456, 465, 466, 458

[56] References Cited

U.S. PATENT DOCUMENTS 5,245,445  9/1993  Fujisawa .................................. 382/261
5,333,211  7/1994  Kanda et al. ............................ 382/261
5,408,337  4/1995  Kanda ...................................... 358/463

Primary Examiner—Scott Rogers
Attorney, Agent, or Firm—Gerald E. Laws; William B. Kempler; Richard L. Donaldson

[57] ABSTRACT

A device and method for filtering out the noise generated due to coding of image data signals. The device has a threshold determining unit, a binary index unit, a filter selecting unit, and an adaptive filtering unit. The threshold determining unit 4 divides each pixel of the input image data into two gray levels. The binary indexes defined by the gray level are checked by a window with a prescribed size. If the region in the window is determined to be a homogeneous region, a heterogeneous region, or an impulse noise region (block 5), the filter selecting unit selects a filter corresponding to the determined region, and the image data is processed by the selected filter.

10 Claims, 2 Drawing Sheets

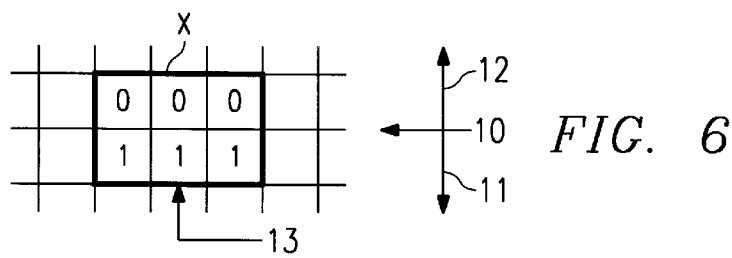
FIG. 4
FIG. 5A HOMOGENEOUS
FIG. 5B HETEROGENEOUS
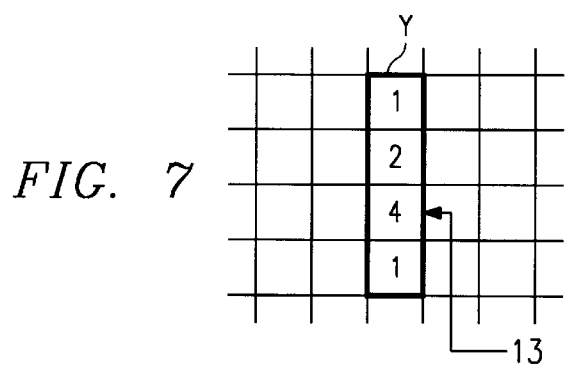
FIG. 6
FIG. 7

METHOD AND APPARATUS FOR SELECTING AN ADAPTIVE FILTER FOR IMAGE DATA

FIELD OF THE INVENTION

The present invention pertains to a technology for processing image data. More specifically, the present invention pertains to a method and device for effectively filtering noise generated when obtaining and coding image data.

BACKGROUND OF THE INVENTION

At present, when high compression of image data is performed by means of image data coding, preprocessing and postprocessing the image data is believed to be important.

Several schemes have been proposed to filter noise generated when obtaining and coding image data, such as median filter, MTM (modified trimmed mean) filter, FMH (FIR-median hybrid) filter, edge preserving smoothing filter, etc.

The median filter is a nonlinear recovering technology which is designed to filter impulse type noises from the image, while preserving the edge. Usually, the two-dimensional median filter uses 3 × 3 or 5 × 5 rectangular mask to enclose the pixel.

MTM filters are a combination of the median filter and mean value filter. Consequently, they can overcome the disadvantage of the median filter and improve the noise suppressing effect. In the processing, the median is first derived. The mean value filter is then applied on the pixel having a value near it as the object, and the result is output. A topic to be solved is how to set the object range of the mean value filter in consideration of the characteristics of the image. Also, it has been pointed out that, compared with the conventional median filter, the edge portion becomes more blurred.

Just as MTM filters, FMH filters are also a combination of the median filter and the mean value filter. However, FMH filters differ from MTM filters in that a mean value filter is applied first. Also, the mask for the mean value filter has a directionality with quantization in 90° or 450°. Compared with MTM filters, they can suppress blurriness of the edge portion, and the amount of computation required can be reduced significantly.

The edge preserving smoothing filter is a type of selective smoothing filter. It performs adaptive switching of the mask according to the localized properties of the region. Several types of polygonal masks are initially defined. Then, the degree of the variation in the pixel value in the region corresponding to each mask is calculated. Then, among the masks, the mask with the smallest degree of variation of the pixel value is selected, and the mean value of the pixel value in the region corresponding to this mask is output. In this case, the noise can be suppressed while the edge is preserved. However, it has been pointed out that the fine texture is lost, which is a disadvantage.

However, the conventional technologies may be unsatisfactory for realizing the following two purposes at the same time: the purpose of clearly displaying the features of the image with edges (the portions where the brightness of the image varies drastically) and texture, and the purpose of noise filtering. The reason for this problem is as follows: for most of the conventional technologies, for each of several prescribed masks, such as horizontal, vertical, or polygonal masks, the statistical value is calculated; the values are compared, and the mask made of homogeneous pixels that can best represent the region is selected. However, the pixels on the selected mask may not necessarily be homogeneous, and they may be heterogeneous in some cases. That is, when the heterogeneous regions that represent the edge and texture as features of the image are subjected to filtering, these features of the image are degraded.

The present invention provides a noise filtering method for realizing two purposes, that is, feature preservation and noise filtering, by determining in a soft and adaptive manner the shape of the mask made of homogeneous pixels instead of making the statistical comparison for the masks prepared beforehand in the conventional manner.

Another purpose of the present invention is to provide a type of DPNF (Detail Preserving Noise Filtering), a filter processing technology using the binary index concept.

Yet another purpose of the present invention is to provide a noise filtering method which can be used for preprocessing the original image data.

Yet another purpose of the present invention is to provide a noise filtering method which can be used in MPEG decoded images.

SUMMARY OF INVENTION

In order to solve the problems of the conventional technology, the present invention provides a noise filtering method for image data characterized by the following facts: the image data containing two-dimensionally arranged pixels is binary coded using a prescribed threshold; according to the positions of the pixels as the object of the filter processing in the binary-coded image data, a window with a size of M × N is defined; and a noise filter is selected in accordance with the various binary data contained in the window.

In a preferable scheme, the image data is first divided into blocks that are larger than the window. For each block, the threshold is determined. Then, by using the threshold, each pixel value of the input image data (including the original image and the decoded image) is divided into two levels to generate binary indexes, which are then checked to determine whether the region is a homogeneous region or a heterogeneous region, and the optimum filter is selected in accordance with the region's characteristics.

According to the present invention, as explained above, the concept of the binary index is introduced, and the noise filter is selected appropriately in accordance with the specific portion, the portion with the features of edges, texture, etc., and the portion without these features. In this way, while the features of the image can be preserved, noise filtering can be realized. Also, the amount of computation needed for this processing can be reduced to much less than that in the conventional scheme.

BRIEF DESCRIPTION OF THE DRAWINGS

FIG. 4 is a diagram illustrating the selection of the filter in the second embodiment of the present invention.

FIGS. 5A–5B illustrate the filter mask in the homogeneous region and heterogeneous region.

FIG. 6 is a diagram illustrating the determined window.

FIG. 7 is a diagram illustrating the 4-tap filter applied when the continuity flag is set.

In the figures, 2 is an index generating unit, 3 a selective local smoothing unit, 4 a threshold determining unit, 5 a binary index unit, 6 a filter selecting unit, and 7 an adaptive filtering unit.

DESCRIPTION OF EMBODIMENTS

Figure 1:
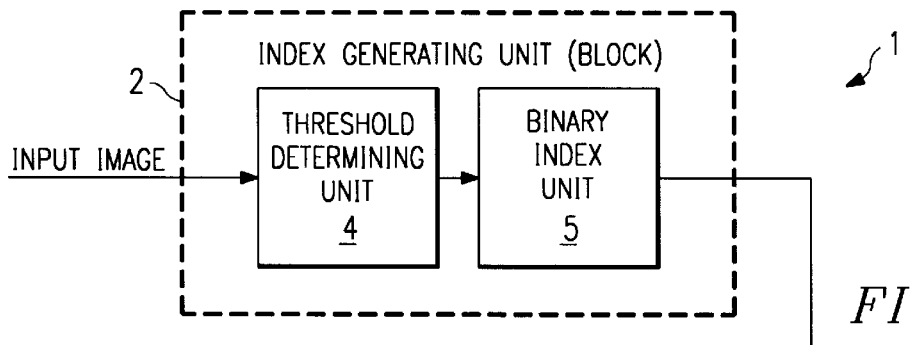
FIG. 1 is a block diagram illustrating the noise filtering process in the first embodiment of the prese nt invention.

FIG. 1 is a block diagram illustrating the noise filtering process pertaining to the DPNF in this embodiment. In this embodiment, noise filtering process 1 consists of two subprocesses, that is, index generating unit 2 and selective local smoothing unit 3. Index generating unit 2 has threshold determining unit 4 and binary index unit 5. Selective local smoothing unit 3 has filter selecting unit 6 and adaptive filter processing unit 7.

The index generating unit 2 uses a prescribed threshold to divide each pixel of the input image into that with a lower gray level or that with a higher gray level. Selective local smoothing unit 3 performs local smoothing for the object pixels having the same index.

Here, the concept of index generation is derived from the block truncation coding that can represent the region containing edges by two or three representative pixel values. Index generation must be performed in units of rectangular blocks that are larger than the M × N window.

In this embodiment, image data with a size of 704 × 408 pixels is input, and the binary indexes are derived on the basis of the 8 × 8 rectangular blocks. The smoothing mask, that is, the filter, has a size that is smaller than this, and may be 3 × 3 or 5 × 5.

First, the image data is input to index generating unit 2, the threshold determining unit 4 is fetched as are 8 × 8-block from the image data. For each block, a threshold is determined. The threshold is determined using the intermediate value of the dynamic range of the pixels in the 8 × 8 block. By using the intermediate value, it is possible to effectively reduce the so-called mosquito noise, that is, noise generated as small spikes around the edges.

In binary index unit 5, the threshold obtained for each block is compared with each pixel value in the corresponding block, and the binary indexes corresponding to each pixel, that is, the binary data representing the higher gray level and the lower gray level, are generated.

Suppose the gray level is p for the pixel tested by using threshold E, the binary index $\phi$ can be defined as follows.

$$\phi = \begin{array}{l} 1 \text{ if } \rho \geq \tau \\ 0 \text{ if } \rho < \tau \end{array} \quad \text{(Eq. 1)}$$

$$\tau = \frac{\max + \min}{2}$$

(where max = maximum value of the gray level in the block, and min = minimum value of the gray level in the block)

In this embodiment, the intermediate value of the dynamic range is used for determining the threshold. However, it is also possible to make use of the mean value and the median (central value) of the dynamic range.

Then, in filter selecting unit 6 of selective local smoothing unit 3, the optimum filter for noise filtering is selected by taking binary index $\phi$ as a reference.

More specifically, selection of the optimum filter is performed as follows: for the binary indexes of the 8 × 8 block, a window of (2N + 1) × (2N + 1) is defined, and the binary indexes $\phi$ in this window are surveyed (at each coordinate (i,j), N = 1 or 2, and i,j = −N, ...O, ...N).

$\phi(i,j)$ and $\rho(i,j)$ represent the binary index and gray level, respectively. The center of the window with i = j = O is the pixel being filtered. Also, filter Λ with weighing coefficient $\lambda(i,j)$ is assumed.

By means of adaptive filter processing unit 7, the adaptive filter processing operation can be performed relatively easily, and it is possible to obtain output level θ.

$$\theta = \frac{\sum_{i=-N}^{N}\sum_{j=-N}^{N}\{\phi(0,0)\overline{\otimes}\phi(i,j)\} \cdot \lambda(i,j) \cdot p(i,j)}{\sum_{i=-N}^{N}\sum_{j=-N}^{N}\{\phi(0,0)\overline{\otimes}\phi(i,j)\} \cdot \lambda(i,j)} \quad \text{(Eq. 2)}$$

Selection of the filter is executed for each window. Classification is made into three types, that is, homogeneous, heterogeneous, and impulse noise, corresponding to the value of each binary index $\phi$ present in the window.

Figure 2:
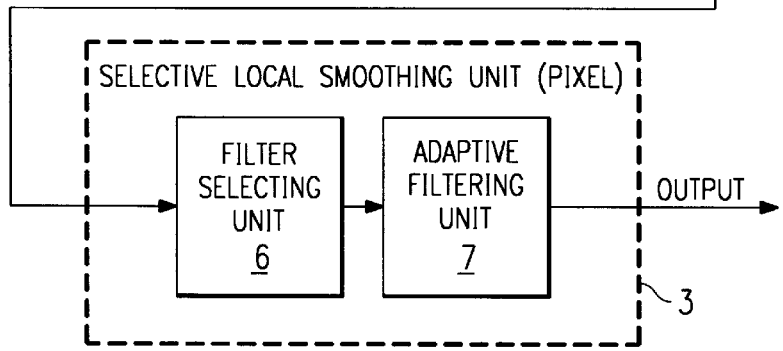
FIG. 2 is a diagram illustrating an example of the selection of a filter for each window region.

FIG. 2 is a diagram illustrating an example of selection of the filter in the case of binary indexes of 8 × 8 block and 3 × 3 window. As can be seen in this fig., 3 × 3 window is defined appropriately to ensure that the pixel being filtered in the 8 × 8 block is located at the center of the window. That is, the pixel having the index at the center of the window corresponds to the output pixel.

Window A has all of the binary indexes $\phi$ contained in it of "0," that is, it indicates that the region is a homogeneous region free of the features of edges, texture, etc. On the other hand, window B represents a heterogeneous region with binary indexes of "0" and "1" combined. It contains the features of edges, texture, etc. Also, window C represents an impulse noise region in which all of the central pixels are surrounded by pixels having the opposite index "0."

Figures 3A, 3B, 3C:
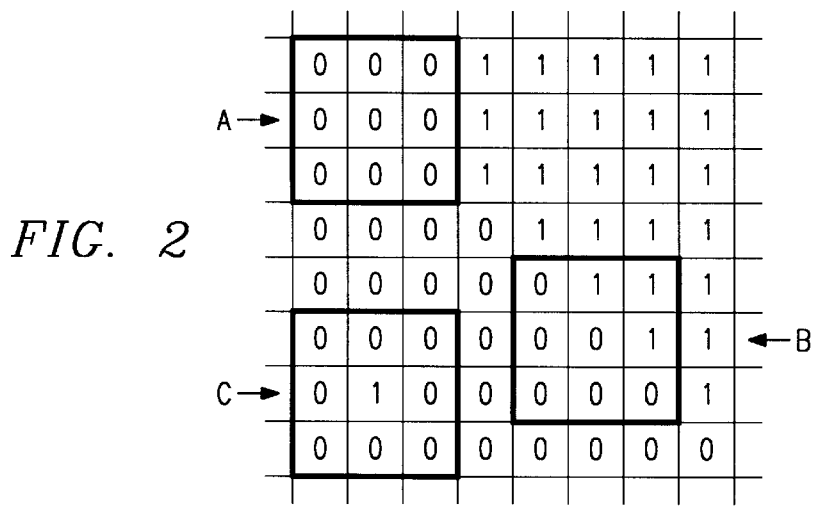
FIGS. 3A–3C illustrate the adaptive filter corresponding to the window shown in FIG. 2.

For the homogeneous region made up of the same indexes, filter processing is performed using a relatively strong smoothing filter to suppress noises. As shown in FIG. 3A, the filter has the coefficients of a size corresponding to the window, and, for the value of the various coefficients, a value of "1/9," which is obtained by dividing by the number of 3 x 3 pixels, is selected.

Then, for the heterogeneous region made up of two indexes, since edges, texture, and other features exist, the filter processing is performed using a relatively weak smoothing filter, and the features are preserved. As shown in FIG. 3B, for the filter, only pixels with the same index as that of the central pixel are counted, and a value of "1/6," which is obtained by dividing by the number, is selected. On the other hand, the coefficient is set as "0" for pixels with an index different from that of the central pixel.

Also, a pixel completely surrounded by pixels with the opposite index is taken as impulse noise, and it is interpolated by the surrounding pixels. As can be seen from FIG. 3C, since there are eight pixels with an index opposite that of the central pixel, a value of "1/8" is selected as the coefficient of the filter. For the central pixel, "0" is selected.

In this way, the weighing coefficient of the filter is selected corresponding to the region characteristics of the window (distance from edges and texture, presence/absence of these features). Also, in this embodiment, for all of i and j, one sets $\lambda(i,j) = 1$, and, for the region containing the impulse, after all of the indexes are inverted, equation 2 is applied.

TABLE I

|  | Median | MTM | FMH | EPS | DPNF 3 × 3 | DPNF 5 × 5 |
|---|---|---|---|---|---|---|
| Addition |  | 51 | 20 | 130 | 18 | 50 |
| Multiplication |  | 26 |  | 65 |  |  |
| Division |  | 2 | 4 | 18 | 1 | 1 |
| Comparison (byte) | 300 | 325 | 9 | 9 | 5* | 7* |

Note:
*Includes the amount of computation for generation of the binary indexes.

Table I lists the amount of calculation for each output pixel of each filter in the conventional technology and in this embodiment. The 5 × 5 window was adopted for other than the filter of this embodiment (DPNF). It can be seen from this table that the amount of computation of DPNF is rather low.

In the following, the second embodiment of this invention will be presented.

The second embodiment pertains to the filtering method using the concept of the binary indexes in the first embodiment. This is an example in which postprocessing with DPNF is applied to the image decoded by MPEG.

For optimization of DPNF of the MPEG standard, the following two preconditions must be met. First, the image resolution is SIF (325 × 240 pixels) or CCIR (701 × 480 pixels), or a value between these two values. Second, the informations in the bit stream, such as the DCT coefficient and quantization scale, cannot be used. Such the filter in this embodiment is attached to the decoder, the latter precondition is important.

The following points should be taken into consideration when the features of MPEG are considered, DPNF is changed to various forms for application to the images decoded by MPEG, and improvement is made in the image quality and cost effectiveness.

Adaption of filter coefficients

Application on interlace scanning images

Suppression of blocking noises

Using a low bit rate

Reducing cost when the hardware is built

First, let us look at the requirement regarding adaption of the filter coefficients. First, just as in the first embodiment, an MPEG decoded image with a size of 704 × 480 is input. From this image, an 8 × 8 block size is fetched, and the threshold is determined for each block, and the binary indexes are derived for the input image.

In the first embodiment explained above, when the filter is selected, the region in the window is classified into three regions, that is, homogeneous region, heterogeneous region and impulse noise region, and filter processing is performed corresponding to the characteristics of the specific type of region. In this embodiment, since it is supposed that little noise of the impulse type is generated in the coding/decoding process, the region with the central pixel completely surrounded by pixels with the opposite index is taken as a heterogeneous region. Consequently, the output of filter processing is equal to the original value of the central pixel.

FIG. 4 is a diagram illustrating an example of the binary indexes of an index-generated 8 × 8 block and the 5 × 50 window defined there. As shown in this fig., window A is a homogeneous region made of all with index "0," while window B is a heterogeneous region made of with indexes "0" and "1,"respectively. A 5 × 5 window is used for both the SIF and CCIR images.

In this embodiment, the filter coefficients are taken as variable. That is, strong smoothing is performed for the homogeneous region, while weak smoothing is performed for the heterogeneous region. In the method making use of the adaptive filtering, use of the strong smoothing filter in the heterogeneous region leads to loss of the edges and other features. On the other hand, use of the weak smoothing filter in the homogeneous region leads to insufficient noise suppression. Also, this adaptive method encompasses the concept of adaptive windowing with a variable size window corresponding to the characteristics of the region, with sizes of the mask differing for different windows. By using a large mask in the slowly varying region, the noise suppression is stressed, and by using a relatively small mask in the significantly varying region, preservation of the features is stressed.

As shown in FIGS. 5(a) and (b), a high-strength smoothing filter is used for the homogeneous region, while a low-strength smoothing filter is used for the heterogeneous region. As the method proposed here is compared with the adaptive windowing, it can be seen that the amount of computation for deriving the degree of the local signal variation of the image for the output is smaller in the method proposed here.

Also, the video sequence is represented on the frame base. Its processing has a wide application range that can meet both non-interlace scanning and interlace scanning, which is preferable. In order to carry this out, the binary indexes have to be derived using two thresholds for each field in the interlace scanning image. That is, the binary indexes must be generated for the odd-numbered field and even-numbered field, respectively. However, this variation does not lead to degradation of non-interlace scanning. Once the indexes are obtained, the filter processing can be carried out on the frame base just as in the original method. Consequently, the method of DPNF can also be applied to the non-interlace scanning image just as the decoded image of MPEG-1.

In the following, the method for suppressing the block noise in the MPEG decoded image will be explained. In the MPEG standard, the decoded signals acquire various features by means of various element techniques, such as DCT (discrete cosine conversion) processing, motion compensation, etc. By optimization of the filter with these characteristics taken into consideration, it is possible to expect a certain degree of performance gain. For MPEG, coding based on an 8 × 8 block DCT is used, and coding is performed with bit amounts differing for different blocks. Consequently, the image quality naturally varies slightly from block to block. Consequently, on the grids (boundaries of blocks) that cut the image into 8 × 8 blocks, the image quality becomes discontinuous, and it becomes represented as block noise.

However, when the smoothing filter is applied to each pixel positioned along the block boundary, there is a possibility that the edge and other features may be lost. Consequently, it is necessary to determine whether the filter is applicable or not based on the binary indexes on the periphery of the block boundary.

In this case, a 2 × 3 size window is used for obtaining a flag indicating the continuity of pixels among blocks (known as the continuity flag). When this window is used to check the continuity flag, it is believed that there are four cases with the block boundary present on the upper side, lower side, right side, and left side, respectively. FIG. 6 is a diagram illustrating an example in which the block boundary is present on the upper and lower sides. In this fig., X represents the window, 10 represents the boundary of the block, 11 represents the inside portion of the block, 12 represents the outside portion of the block, and 13 represents the pixel to be filtered on the inside of the block.

Suppose the window is represented by $\Gamma$ made of $\Gamma(i,j)$, the continuity flag is set when condition equation 3 is met in the case when the binary indexes with the following block boundary held between them can be boldly classified to "0" and "1." Then, when the continuity flag is set, the 4-tap filter Y shown in FIG. 7 applies.

$$\sum_i \sum_j \phi(i,j) \cdot \{\gamma(i,j) \otimes \phi(0,0)\} = 6 \qquad \text{(Eq. 3)}$$

In the following, application at a low bit rate will be explained.

In this embodiment, the phrase "low bit rate" means a coding bit rate of up to 4.0 Mbps in the CCIR resolution, and $$\theta = \frac{\sum_{i=-2}^{2}\sum_{j=-2}^{2}\{\phi(0,0)\otimes\phi(i,j)\}x\lambda(i,j)xp(i,j)}{\sum_{i=-2}^{2}\sum_{j=-2}^{2}\{\phi(0,0)\otimes\phi(i,j)\}x\lambda(i,j)} \qquad \text{(Eq. 4)}$$

To cut the cost of realizing the filter in hardware, hardware, it is possible to use a shift operation to replace the division operation of Eq. 4 for obtaining output gray level $\theta$. This change is needed only for the heterogeneous region. A conventional shift operation can be applied to the homogeneous region. So we use the approximation:

$$\theta = \left[ \sum_{i=-2}^{2}\sum_{j=-2}^{2}\{\beta(i,j)xp(i,j) + \overline{\beta}(i,j)xp(0,0)\}x\lambda(i,j) \right] * 5 \qquad \text{(Eq. 5)}$$

where there is the boolian function:

TABLE II

| | $\beta(i,j) = \phi(0,0) \otimes \phi(i,j)$ | | | | | |
|---|---|---|---|---|---|---|
| | Determination of threshold | | Binary index | Selection | Adaptive filtering | | |
| | 8 × 8 | 16 × 16 | 12 × 12 | of filter | Homogeneous | Heterogeneous | Boundary |
| Addition | | | | | 21 | 5 | 4 |
| Multiplication | | | | | | 1 | |
| Shift | | | | | 6 | 3 | 3 |
| Comparison | 65 | 96* | 144 | | | | |
| Bit operation | | | | 50 | | 4 | 12 |

Note:
*The amount of computation for determining the threshold in the 8 × 8 block is not included.

up to 1.15Mbps in the SIF resolution. When the bit rate enters the range of "low bit rate," the noise deviates significantly from the features, just as in the region near the features. For example, it often becomes significant in the region over the block size (=8 pels).

In order to suppress noise of this type, the multiplex block size method is introduced to determine the threshold. First, the dynamic range of the 8 × 8 block is studied. If it is smaller than the prescribed value (known as the minimum dynamic range), with the initial 8 × 8 block at the center, the dynamic range of the 16 × 16 block is studied. Based on this dynamic range, the threshold can be calculated for the default block. In this operation, the region in which blurring was generated due to processing as a homogeneous region without considering its proximity to the features is now determined as a heterogeneous region. As a result, it is possible to prevent blurring and other types of degradation. From the experimental results, it is believed that 64 is an appropriate value for the minimum dynamic range. As a matter of fact, this value is later used in the simulation. Also, this operation does not affect the filter processing itself. In addition, the amount of computation needed for determining the threshold can be reduced by carrying out subsampling in the horizontal direction in a ratio of 2:1 for the 8 × 8 block and in a ratio of 4:1 for the 16 × 16 block.

Assuming we have a filter A composed of the weighting coefficients $\lambda(i,j)$, adaptive filtering obtains an output gray level $\theta$ given by:

Table II lists the amounts of computation needed for DPNF including all of the changes. It can be seen from this table that the amount of computation of DPNF remains on a rather low level. Since a great deal of bit operations are included in DPNF, the amount of computation can be kept rather low. However, the memory for binary indexes is newly needed. At least 64 (8 × 8) bits are needed. Also, when a 5 × 5 window is used for processing up to the block boundary, 144 (12 × 12) bits are needed.

Consequently, according to the method in this embodiment, it is possible to reduce the amount of computation and to preserve the features. On the other hand, it is possible to suppress the mosquito noise, blocking noise, and other easily visible defects. The other advantages include the fact that this method can be used by both MPEG-1 and MPEG-2, and that it is applicable to JPEG as well. In addition, it can also be used as the loop filter of the MPEG encoder, such as the real-time encoder for MPEG-2 of TI.

Also, the present invention is not limited to the embodiments.

According to the present invention, binary indexes are generated from the image data; the portions where there are edges, texture, and other features and the portions free of these features can be identified easily; hence, a filter can be selected. Consequently, the noises generated when obtaining and coding the image data can be effectively filtered, while the features contained in the image can be appropriately preserved.

Also, according to the present invention, it is possible to realize the high rate of processing needed for noise filtering.

I claim:

1. A method of filtering noise from an input image data signal representing two-dimensionally arranged pixels, comprising the steps of:

decoding the image data signal to form an array of pixels each having a color value, assigning a binary coded index value to each of the pixels in accordance with the color value and a threshold value to form a block of binary coded index values;

evaluating a portion of the binary coded index values within the block of binary coded index values corresponding to a two-dimensional window of size M × N: and selecting a noise filter in accordance with the portion of binary coded index values contained in the window.

2. The method of claim 1 including the steps of dividing the image data signal into blocks with a size of P × Q (where P and Q are larger than M and N) before the binary coding step, determining a threshold for each block, and then assigning a binary coded index value to each of the pixels within each block using a threshold determined for each corresponding block.

3. The method of claim 1 wherein the threshold is determined by the intermediate value of the dynamic range of the color values of the pixels in the entire image data signal.

4. The method of claim 2 wherein each threshold is determined by the intermediate value in the dynamic range of the color values of the pixels of the image data signal in the corresponding block.

5. The method of claim 1 including the steps of examining the image data signal by a two-dimensional window of predetermined size, determining a region type according to whether the region of image data signal enclosed by the window is a homogeneous region, a heterogeneous region, or an impulse region, and applying a filter having M × N filter coefficients corresponding to the region type to the image data signal.

6. The method of claim 5 wherein when the region in the window is a homogeneous region a relatively strong smoothing filter is to the image data of the region, and when the region is a heterogeneous region a relatively weak smoothing filter is applied to the coded image data of the region.

7. The method of claim 1 wherein the image data is obtained by decoding a compression-coded movie image.

8. The method of claim 1 wherein the binary coded index has a value of either "O" or "1".

9. The method of claim 1 wherein the step of selecting a filter further comprises assigning none-zero filter coefficients only to pixels within the two-dimensional window that have index values the same as a pixel in the center of the window.

10. A device for reducing noise in an input image data signal representing two-dimensionally arranged pixels, each pixel having a color value, comprising:

a threshold determining unit for determining a threshold value based on the range of color values of at least a portion of the pixels corresponding to a twodimensional block of size of P × Q;

a binary index unit for assigning a binary coded index value to each of the pixels in the block of P × Q in accordance with the threshold value to form a block of binary coded index values of size P x Q;

a filter selector unit for selecting a filter in response to a set of binary coded index values selected from the block of binary coded index values by a two-dimensional window of dimension M × N; and adaptive filtering unit for applying the selected filter to a set of pixel color values corresponding to the two-dimensional window of dimension M × N to form a resultant color value for a pixel in the center of the two-dimensional window.

* * * * *